Feb. 25, 1964 A. R. PARILLA 3,122,378
FLUID SPRING SYSTEM FOR VEHICLES
Filed Feb. 21, 1956 6 Sheets-Sheet 1
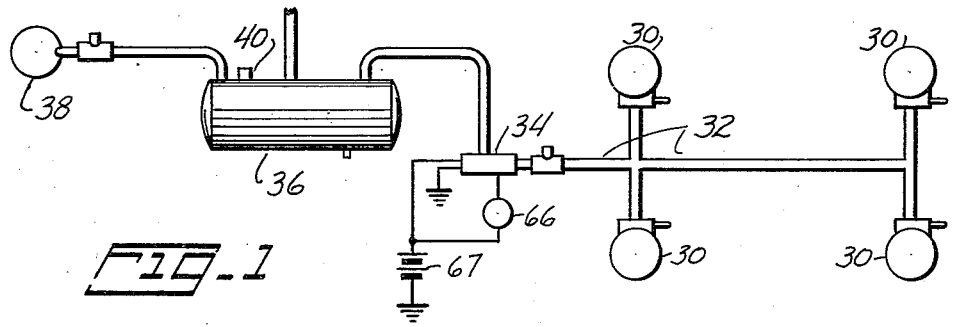
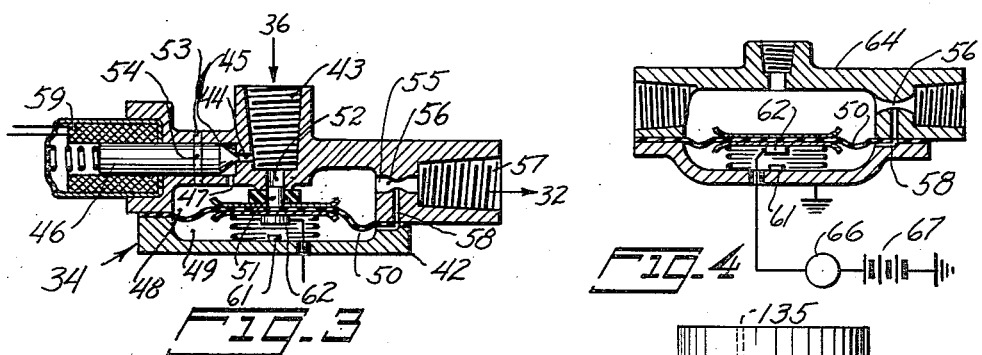
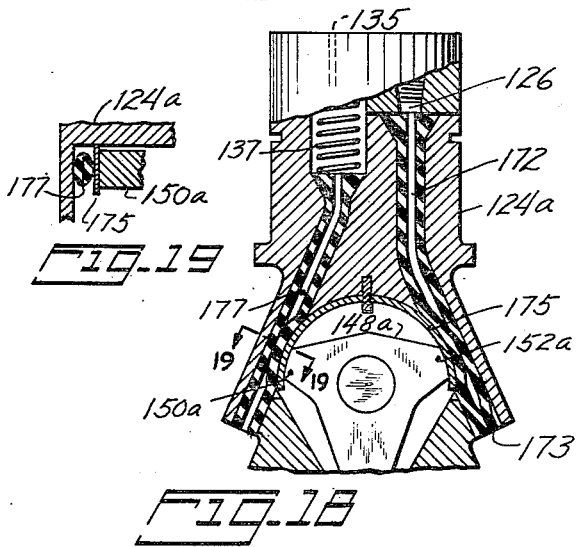
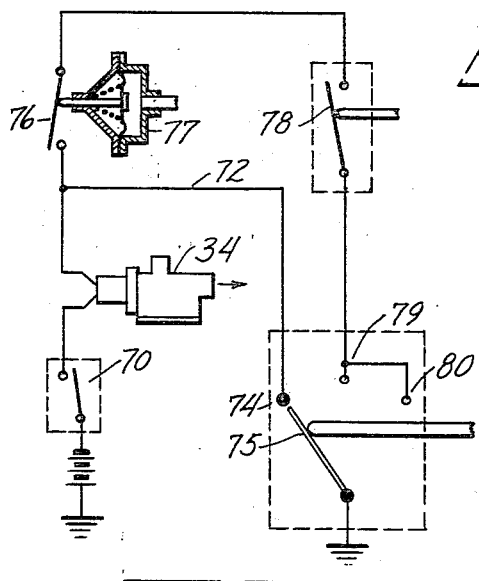
INVENTOR
ARTHUR R. PARILLA
BY
ATTORNEY Feb. 25, 1964 A. R. PARILLA 3,122,378
FLUID SPRING SYSTEM FOR VEHICLES
Filed Feb. 21, 1956 6 Sheets-Sheet 2
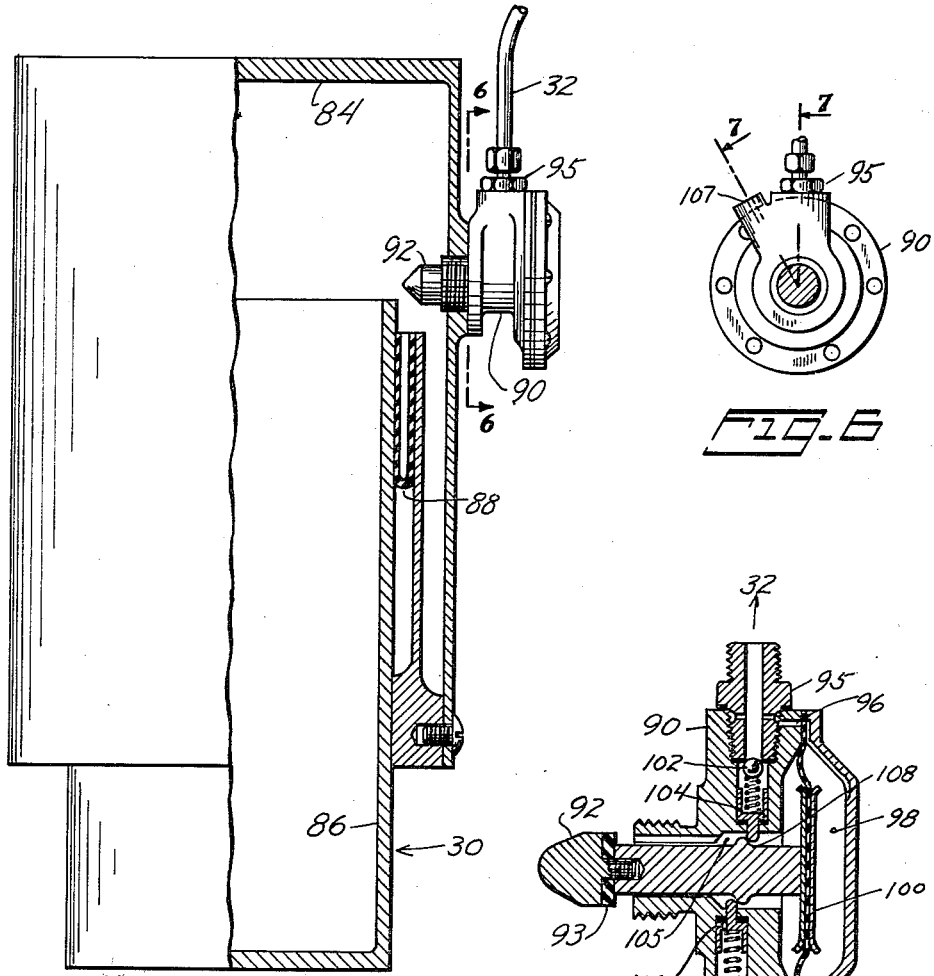
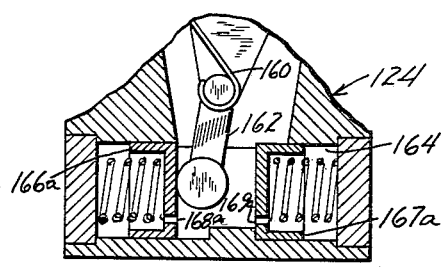
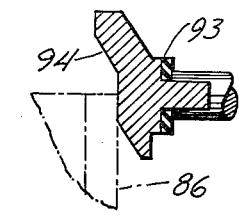
INVENTOR
ARTHUR R. PARILLA
BY
ATTORNEY

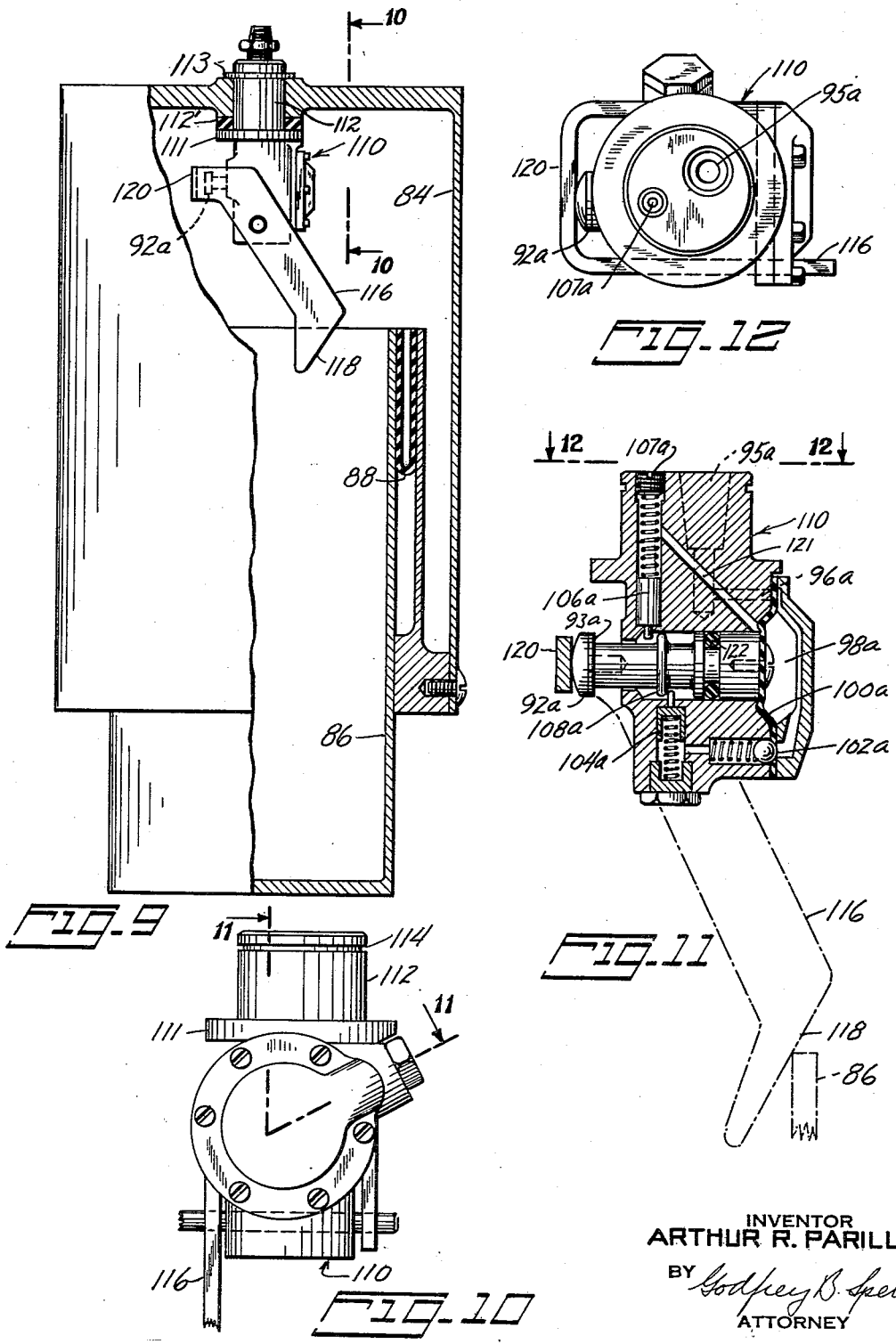

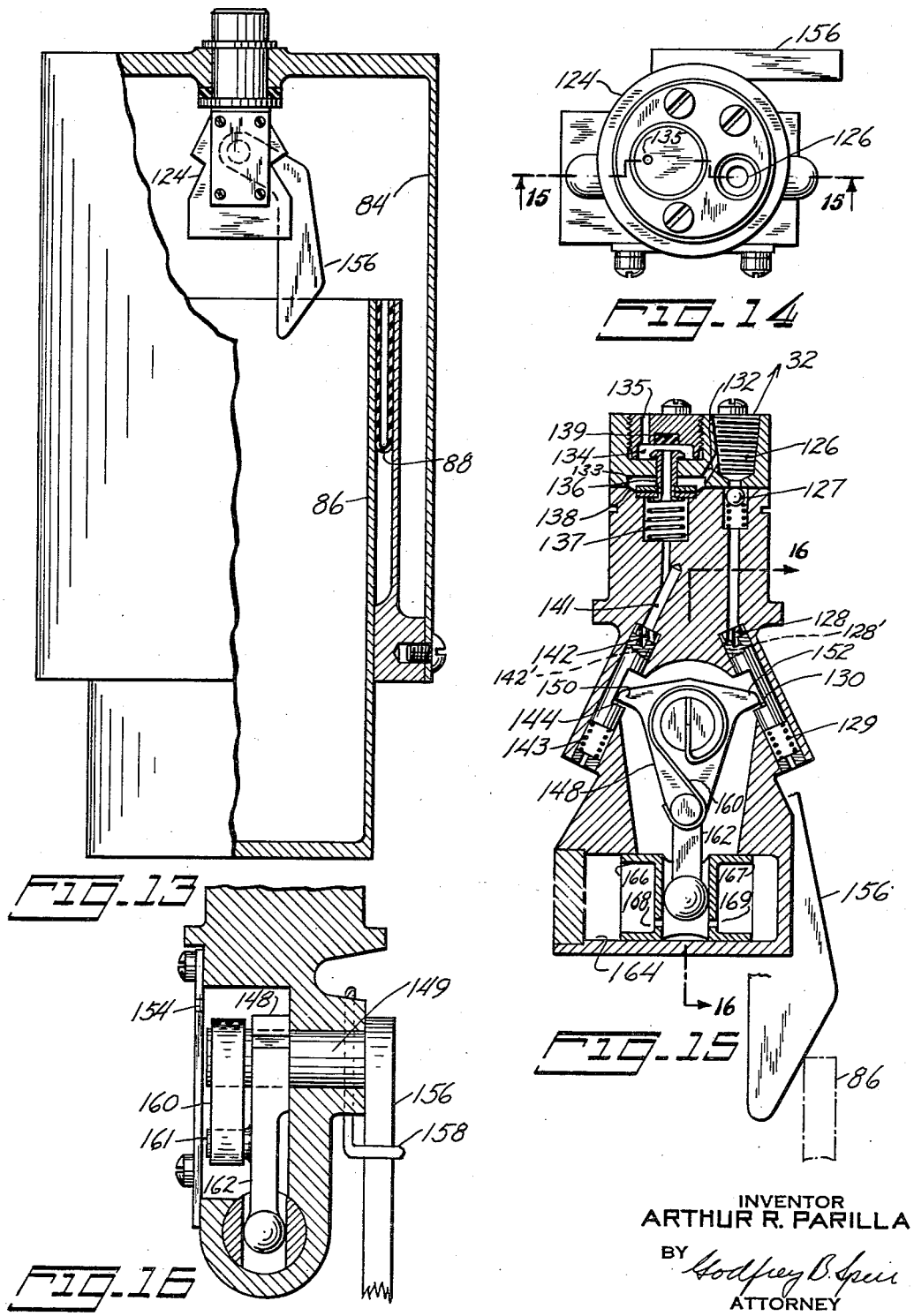

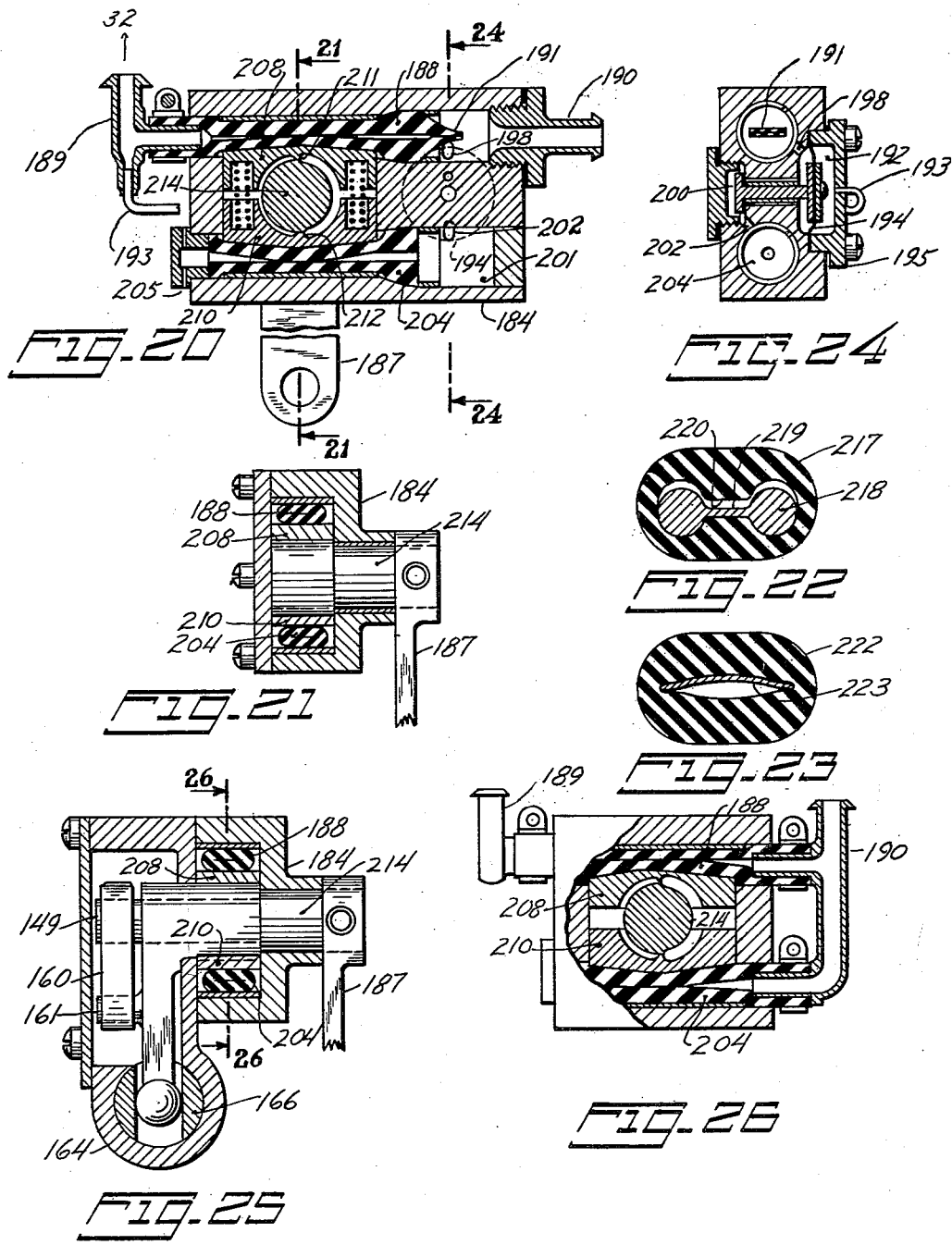

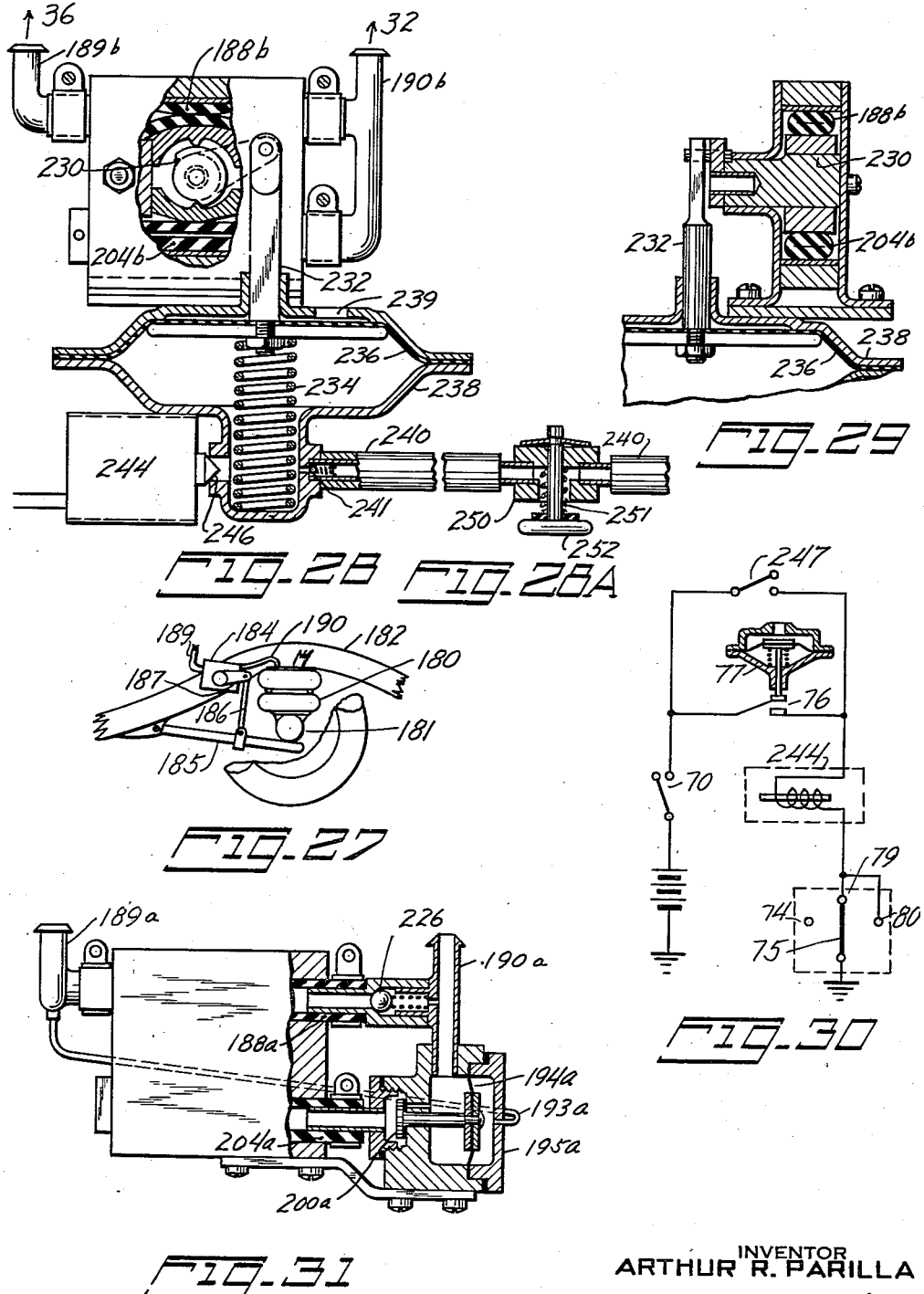

United States Patent Office 3,122,378
Patented Feb. 25, 1964

3,122,378
FLUID SPRING SYSTEM FOR VEHICLES
Arthur R. Parilla, 34 Crestview Road,
Mountain Lakes, N.J.
Filed Feb. 21, 1956, Ser. No. 567,008
22 Claims. (Cl. 280—6)

This invention relates to elastic fluid springs for vehicular suspensions, and provides means to level the sprung parts of a vehicle at a desired height relative to the road and unsprung parts, regardless of the loading of the vehicle.

Elastic fluid springs for vehicles, particularly automobiles and trucks, have been shown in the art, for instance in my Patent #2,275,462. The latter may be modified according to my pending application Serial #432,745 filed May 27, 1954 and now abandoned. This patent is only exemplary, as there are other elastic fluid springs in the art. In general, these provide an expandible and compressible compressed-air, or gas containing container, one part secured to vehicle sprung parts, and another secured to vehicle unsprung parts. The compressed gas resiliently supports the vehicle body; the volume of the gas chamber determines the "softness" of the spring. Features may be incorporated in the spring to provide shock damping.

The height of such a spring depends on the load upon it. Since it is desirable to provide as "soft" a spring as possible, large deflections of the body result when vehicular load is changed as by entry and exit of passengers, or by modifying cargo.

This invention provides means, both automatic, semi-automatic, or manual, as desired, for regulating the amount of gas in elastic fluid springs, to maintain substantially constant static vehicle body height. This not only enhances vehicle appearance, but enables shortening the length of the fluid springs, and, conceivably, lowering vehicle height. A certain allowance for spring action is necessary to absorb bumps and road shocks. The allowance for load change must be added to this ordinarily. If constant level can be attained regardless of load, only the allowance for road shocks need be designed into the springs and vehicle.

My invention includes means for establishing desired vehicle level in connection with fluid springs, and comprises broadly, a compressed gas supply, means for directing the compressed gas to the springs, and means associated with each of several springs to establish its desired height. If the spring is low, it requires inflation from the gas supply; if high, gas is vented from it.

Two fluid suspension systems are described below: one system provides a rapid inflation cycle which may be completed while the vehicle is still at rest, or at only low speeds of forward motion, and which may be controlled manually or semi-automatically, the second system provides for completely automatic operation in which a longer inflation cycle may occur while the vehicle is at rest or in motion.

While the fluid springs may be of any type, such as a bellows, the preferred form comprises telescopic, open-ended cylinders sealed to retain a compressible fluid under pressure. The upper cylinder supports the body, or sprung mass, while the lower cylinder is supported by the wheel through suitable structure, constituting unsprung mass.

The following are objects of the invention:

a. A primary object is to provide a suspension system composed of fluid springs, with means to adjust the inflation pressure so as to maintain a constant normal spring length while supporting a variable load.

b. A further object is to provide a fluid suspension system in which the height of each fluid spring is controlled individually, so as to provide for unsymmetrical as well as symmetrical load distribution; and in which inflation or deflation may occur in any combination of fluid springs simultaneously while under a single master control.

c. Another object is to provide means, operable manually or semi-automatically, whereby the inflation system is operative only while the car is at rest, or at low speeds, but which automatically goes out of action becoming inoperative during continued oscillation of the sprung and unsprung masses over the road, resulting in reduced consumption of fluid, less wear, and greater life.

d. An alternate object to (c) above, is to provide means whereby automatic inflation may continue while the vehicle is at rest or in motion, and in which inflation or deflation occurs only for sustained displacement from a normal length, but is indifferent to displacements which occur for shorter periods, such as occur dynamically during normal vibration over the road.

e. A further object for the alternate system in (d) above is to provide a time delay for opening of high pressure, or vent, poppet valves when spring length is displaced from its normal position, but which provides faster response for closure of such valves when spring length returns to normal position.

f. Another object is to make the inflation system inoperative when the car is at rest and unattended, such as when parked at the curb, so as to prevent inadvertent operation of the fluid system when the car is jounced by childish pranksters.

g. Another object is to provide a levelling valve, including a high pressure inlet valve, a vent valve, and other features, sufficiently compact for installation directly within, or on a fluid spring, and communicating directly therewith, thereby improving reliability by eliminating additional seals, tube connections, and other sources of leakage as may occur when a levelling valve is mounted elsewhere as a separate component.

h. Another object is to utilize the relative position of the upper and lower cylinders themselves to indicate spring length; with means whereby the levelling valve senses this relative position and opens either the high pressure or vent valve, as required, and closes both for the normal relative position of the cylinders. This reduces the weight, cost, and wear occuring when additional linkages, brackets, bushings, etc., are required when the valve is mounted as a separate component.

i. Another object is to utilize the high pressure fluid supply to energize the levelling valve, thus placing it in operating position, and to utilize the internal fluid pressure within the fluid spring to return the levelling valve to a closed position automatically when it is de-energized by venting the high pressure lines.

j. Another object is to make the levelling valve self-sealing when de-energized, and to utilize the internal fluid pressure within the fluid spring to maintain an effective seal on the valve.

k. Another object is to provide an inflation system in which the fluid supply lines or tubing, leading to each fluid spring, are normally vented to atmosphere, except during brief periods of inflation. This reduces possible sources of leakage, and, in the event of a line failure, will not bleed the fluid springs rendering the car inoperative.

l. Another object is to use compressed air as the working fluid, with an "open" system which vents fluid within the air springs to atmosphere, thereby eliminating a second return line from each air spring, thereby a single high pressure line only being required.

m. Another object is to provide an optional system whereby generation of compressed air on the vehicle may be replaced, or supplemented, by a single external connection, from which all air springs may be inflated or deflated as required simultaneously, and to the desired height, automatically, with compressed air supplied from an external source, such as at gasoline service stations.

*n*. Another object is to reduce manufacturing costs and improve reliability of leveling valves by eliminating machined valve elements and using elastomeric flexible bladders as valves, which are compressible for positive non-leaking closure, and expandable for opening and passage of fluid.

*o*. Another object is to provide levelling valves which may be mounted remotely from fluid springs and remain responsive to vehicle height.

*p*. Another object is to provide means for automatically energizing a signal, such as a dash light, for the duration of the inflation cycle.

These objects and others will become apparent from the following detailed description, read in connection with the annexed drawings, in which similar reference characters represent similar parts and in which:

FIG. 1 is a diagram of a fluid suspension system including a fluid accumulator, valving, and a set of fluid springs.

FIG. 2 is a diagram of a suitable electric circuit for controlling a solenoid valve as in FIG. 1.

FIG. 3 is a longitudinal section through a solenoid control valve.

FIG. 4 is a longitudinal section through a flow valve for operating a pilot light.

FIG. 5 is a fragmentary longitudinal section through a fluid spring having a self-levelling valve.

FIG. 6 is a view on the line 6—6 of FIG. 5.

FIG. 7 is a section on the line 7—7 of FIG. 6.

FIG. 8 is a fragmentary section of an alternative actuator for the FIG. 7 valve.

FIG. 9 is a fragmentary longitudinal section through a fluid spring equipped with an alternative self-levelling valve.

FIG. 10 is a view on the line 10—10 of FIG. 9.

FIG. 11 is a section on the line 11—11 of FIG. 10.

FIG. 12 is a view on the line 12—12 of FIG. 11.

FIG. 13 is a fragmentary longitudinal section through a fluid spring having an alternative self-levelling valve.

FIG. 14 is a plan of the valve in FIG. 13.

FIG. 15 is a longitudinal section through the valve of FIG. 13, taken on the line 15—15 of FIG. 14.

FIG. 16 is a section on the line 16—16 of FIG. 15.

FIG. 17 is a section of part of the structure of FIG. 15 in a different operative position.

FIG. 18 is a section like that of FIG. 15, showing alternate valve details.

FIG. 19 is a section on the line 19—19 of FIG. 18.

FIG. 20 is a section through another self-levelling valve assembly embodiment for use apart from a fluid spring.

FIG. 21 is a section on the line 21—21 of FIG. 20.

FIGS. 22 and 23 are sections through alternative forms of valve tubes.

FIG. 24 is a section on the line 24—24 of FIG. 20.

FIG. 25 is another valve assembly modification in cross section.

FIG. 26 is a section on the line 26—26 of FIG. 25.

FIG. 27 is a diagram of fluid spring and vehicle elements using valves of FIGS. 20 or 26.

FIG. 28 is a fragmentary section through an alternative control valve.

FIG. 28A is a section through a manual vent valve.

FIG. 29 is a section through part of FIG. 28.

FIG. 30 is an alternative control system and

FIG. 31 is a partial section through an alternative control valve.

Referring first to FIG. 1, four fluid springs are indicated at 30, each equipped with an appropriate type of self-levelling valve, and each connected to a manifold 32 capable of conducting pressurized fluid to the fluid springs from a special valve 34. This, as will be described, may include a solenoid for its actuation, and the solenoid valve is furnished with pressure fluid from an accumulator 36. The accumulator, fed from a motor or engine driven pump 38 of moderate capacity, is provided with an appropriate drain cock, a relief valve or safety burst disc 40, and if desired, additional manifolding for operation of other accessories on the vehicle. A check valve may also be incorporated to enable charging of the accumulator from service station compressed air supplies.

A suitable solenoid valve 34 is shown in FIG. 3, and comprises a body 42 having a fluid entry port 43 leading through an orifice 44 to a chamber 45 containing a valve plunger 46 normally spring pressed to close the port 44. This chamber communicates through a restricted orifice 47 with the upper side of a chamber divided into upper and lower parts 48 and 49 by a diaphragm 50. The diaphragm is spring pressed upwardly as shown, and carries a valve 51 which normally closes a port 52 leading from the entry port 43 to the chamber part 48. The housing 42 also contains a vent passage 53, normally open through a groove 54 around the stem 46, but closable at times by the body of the valve stem. An exit 55 is formed in the housing, leading from chamber part 48, through a venturi 56 to a port 57 connecting to the manifold 32. An orifice 58 leads from the venturi throat to the chamber part 49.

The valve 46 may be retracted from the port 44 to open it by energizing a solenoid winding 59. With the port 44 open, the vent 53 is closed, and compressed fluid flows through it and into the chamber part 48, building up moderate pressure therein and pushing the diaphragm 50 down. This opens port 52, admitting more compressed fluid to the chamber, which then flows through the venturi 56 into the manifold. Upon flow through the venturi, the lower chamber part 49 is depressed, as to pressure, by the low pressure in the venturi throat communicated thereto through the orifice 58. So long as the fluid springs 30 require fluid makeup the valve 52 remains open, but when there is no more flow through the venturi, pressure in part 49 builds up and the spring therein raises the diaphragm and closes valve 52. The solenoid valve stem 46 may be opened only a brief interval to start the flow; if it closes before flow is completed, the valve 52 remains open until flow is completed. While vent 53 is opened upon closure of valve 46, its orifice is small and will bleed only a small fraction of air or fluid delivered to the outlet 57. Upon cessation of flow and closing of valve 52, pressure fluid in the manifold 32 and valve body 42 is vented at 53.

The body 42 may carry an electrical contact 61, engageable by a contact 62 on the diaphragm.

FIG. 4 shows a fitting 64 having the diaphragm 50, spring, contacts 61 and 62, venturi 56 and passage 58 of FIG. 3, which may be used as a pilot light actuator in a manually controlled system. This includes a pilot light 66 and battery 67. When fluid flows through the fitting, the switch 61, 62 is closed, lighting the pilot and indicating flow.

The contacts 61 and 62 of FIG. 3 are similarly arranged, to provide a visual indication of charging of the system with which the solenoid valve is used.

FIG. 2 shows a control circuit for the solenoid valve 34 and for the fluid spring charging, making recharging responsive to certain inaction phases during vehicular operation. Occasional recharging, on an automatic or semi-automatic basis, is all that is necessary; continuous recharging is redundant.

In FIG. 2, a switch 70 is operable coincidentally with the vehicle engine ignition switch, to supply electrical power to the solenoid of valve 34. From the valve, one return circuit may be through a wire 72 to a switch point 74 closed with a switch arm 75 operated by the transmission range selector which is grounded, when the gear shift or range selector lever is in "neutral" position. Another or an alternative return circuit is through a pressure switch 76 actuated by lack of pressure in a device 77 operated by oil pressure from the vehicle transmission system. The switch 76, in turn, is connected through a switch 78 operated by the engine throttle or accelerator, the switch closing only when the throttle is closed. Switch 78, in turn, is connected to points 79 and 80 associated with the transmission range selector, these points being engageable by the switch arm 75 when the selector is in "drive," "low," or "reverse" respectively.

In the system of FIG. 2, when the transmission range selector is in neutral, with switch 75 on contact 74, the solenoid of valve 34 is energized when ignition switch 70 is "on." In this condition, the engine may be accelerated or idled with the vehicle static, while the solenoid is energized and the fluid springs are recharging. When the transmission range selector is moved to "drive" or "reverse," with switch 75 on points 79 or 80, the circuit shifts from the lead 72 to the switches 76 and 78. These switches are closed when the vehicle is not travelling, energizing the solenoid of valve 34 and enabling the fluid springs to be recharged by action of their self-levelling valves. Action of the actuator 77, and opening of switch 76, is responsive to power transmitting operation of the vehicle transmission, so that the valve 34 closes during vehicle travel. Likewise, the engine throttle or accelerator operated switch 78 opens upon engine throttle opening, allowing valve 34 to close. Thus, when the vehicle is travelling and is subject to road shocks, the fluid springs are not subjected to the recharging operation. Thus, recharging occurs when brief stops are made in automatic transmission vehicles for loading or unloading passengers or cargo, as would happen with buses or light trucks. This interrupted or occasional recharging or self-levelling is more desirable for such vehicles than a continuous system, as it affords less wear on the components of the system, and always operates when real load changes occur with the vehicle standing. This is to be distinguished from any arrangement which operates with a vehicle in motion, when false levelling may be secured as a result of spring action for shock absorption, unless delay-action devices are incorporated.

However, as will be seen in connection with some of the figures to be described, fully automatic operation can be readily attained, wherein fluid pressure is held in the manifold 32 when the vehicle is travelling. Therein, the fluid springs themselves incorporate self-levelling features along with time-delay action, whereby short-duration oscillations of the air spring do not valve fluid to or from it, but whereby sustained change in normal static weight of the vehicle enables fluid spring adjustment. In such a system, the fluid reservoir is connected to an appropriate shut-off valve, and thence to the fluid springs, the valve being left open only when vehicle operation is incipient or in progress.

Thus, it will be plain that the system of FIGS. 1, 2, and 3 is essentially for fluid springs having no inherent time delay, while a more direct charging control may be used with those incorporating time delay. Also, the system of FIGS. 1, 2, and 3 enables venting of the manifold 32 when charging or self-levelling is not called for, as during extended travelling.

Reference should now be made to FIGS. 5–8, showing a first form of self-levelling fluid spring and self-levelling valve, and adapted for use with a semi-automatic or manual recharging system.

Herein a cylinder and plunger 84 and 86 are shown, respectively secured to the vehicle frame or body and to the axle, and sealed relative to each other as by a rolling seal sleeve 88 (as an example of one non-limiting mode of sealing). A valve body 90 is secured in the cylinder wall, which has a tapered-end retractable rod 92 (or, in alternate form, 94 of FIG. 8) extending therefrom for engagement at times with the upper end of the plunger 86. Near the end of the rod 92 is a seal washer 93 to seal against the end of the housing at times, closing off a cavity 105 from the interior of the fluid spring. As shown in FIG. 5, the supply manifold 32 connects to the valve 90 at 95, whence fluid passes through a passage 96 to cavity 98 closed on one side by a housing cover 99 and on its other side by a movable diaphragm 100, the latter being secured to the rod 92. When the manifold 32 is pressurized fluid enters the cavity 98 and urges the rod 92 leftwardly as shown. When the manifold is vented, the rod 92 may move rightwardly, whereupon the seal washer 93 engages the end of the valve body 90, sealing the fluid within the spring against leakage. Pressure from the fluid spring acts on the left of diaphragm 100 when the washer 93 is not seated, to retract the rod 92 from engagement with plunger 86 when fluid pressure is vented from cavity 98. Connection 95 also leads to a check valve 102 and thence to a spring-closed poppet valve 104 which when open admits pressure fluid to the zone 105 which communicates with the inside of the fluid spring. The housing 90 is also provided with a poppet valve 106, spring pressed to a closed position. This valve, when open, vents the fluid spring and zone 105 to atmosphere at 107. The valve 106 is offset from the valve 104 by a distance to permit an annular lobe 108 to lie therebetween with both valves closed, as shown. This is the position of the rod, axially, when the cavity 98 is pressurized and when the tapered end of the rod 92 is engaged by the upper end of the fluid spring plunger 86, and when the plunger 86 and cylinder 84 are in the correct height or length relation to each other for static load support. If the fluid spring is too short, the plunger 86 cams the rod 92 to the right; the cam 108 raises the poppet 104 and admits fluid to the air spring to inflate it to the correct length, whereupon the poppet closes.

If the fluid spring is too long, implying overinflation, the rod 92 extends fully to the left and the cam 108 opens the vent poppet 106, relieving fluid from the air spring until the correct length is reached when the poppet 106 closes.

When pressure in the cavity 98 is relieved, by venting of the supply manifold 32, the superior fluid pressure within the air spring acts on the left side of diaphragm 100, moving the rod 92 rightwardly to an inactive position, wholly out of engagement with the fluid spring plunger, and concurrently sealing the cavity 105 by the seal 93. Thus the self-levelling valve is not in operation during normal oscillation of the fluid spring during vehicle travel. As the rod 92 retracts rightwardly, the cam 108 transiently opens poppet 104, but fluid may not escape back into the manifold 32 due to the check valve 102.

FIGS. 9–12 show a second form of self-levelling valve, in the same sort of fluid spring as depicted in FIGS. 5–8. This valve, 110, is disposed in the head of the cylinder 84, and comprises a cylindrical stem 112 which is inserted through a matching bore in the cylinder head, from the inside of the cylinder. A shoulder 111 on the valve engages a seal gasket 112, sealing against the inner wall of the cylinder, and the valve housing is held in place on the cylinder 84 by an external snap ring 113 engaging a groove 114 in the stem 112. The interior of the valve 110 is somewhat like that in the prior valve form but is more compact, and like reference characters are applied to like parts, the reference characters being followed by the letter $a$. In general the previous description is applicable, except as follows:

The valve 110 carries a pivoted lever 116 having a sloped portion 118 engageable with the fluid spring plunger 86. The upper end of the lever carries a part 120 engageable at times with the plunger 92a of the valve 110. When the fluid spring is too long, the lever 116 swings counter-clockwise as shown, allowing the plunger 92a to move leftwardly, moving the cam ring 108a with it to open vent poppet 106a. When the spring is too short, needing more fluid, opposite plunger action occurs, the cam 108a opening fluid poppet 104a and admitting fluid to lengthen the fluid spring to the preset level. Venting of fluid from the supply manifold 32 relieves pressure in the cavity 98a, whereupon plunger 92a moves to an extreme rightward position, allowing the lever to move out of the path of the plunger 86 during normal fluid spring action as when the vehicle is travelling. In this embodiment, the diaphragm 100a is smaller than in the prior one, as it is vented on its left side through a conduit 121. The diaphragm end of rod 92a is fitted with a ring seal 122 to prevent leakage of fluid from the spring to the conduit 121. Pressure from the fluid spring only acts over the area of rod 92a, rather than over the entire area of diaphragm 100a.

The left end of rod 92a is fitted with a seal 93a, so that the fluid spring is tightly sealed thereby when the fluid manifold 32 is vented.

In FIGS. 13–17, a third self-levelling valve is shown, in the same type of fluid spring as before. This valve 124 is adapted for an inflation system wherein the supply manifold 32 is pressurized during vehicle operation and travel. The valve 124 incorporates time delay features which prevent charging or venting of the fluid spring and action of the valve mechanism during rapid action of the spring. But the valve does respond to relatively long-duration load changes whether the vehicle is standing or in motion. The valve also includes means to be described to prevent unwanted venting of fluid springs when the vehicle is standing with the power off, as might occur if the vehicle were jounced, rocked or disturbed while parked. Valve 124 is mounted in the fluid spring in the same manner as the valve 110 in FIGS. 9–12. It comprises a pressure fluid entry port 126 leading to a check valve 127 and thence to a poppet valve 128. The latter is spring urged at 129 to a closed position, and has a shoulder 130 for engagement by an opening actuator. A port 132 also leads from entry port 126 to a chamber 133. Another chamber 134 above chamber 133 has a vent opening 135 emerging to the atmosphere. A vent valve 136 in the chamber 134 has a hollow stem, the valve being urged upwardly by a spring 137, and being sealed in the chamber 133 by a yielding diaphragm 138. With no supply pressure from port 132, the spring urges the stem upwardly, sealing the stem upper end against a resilient plug 139 in the valve housing, thus shutting off the vent. With pressurized fluid in the chamber 133, the stem is forced down, opening the stem hollow to the vent chamber 134. The stem hollow communicates with a port 141 leading to a vent poppet 142, which is urged by a spring 143 to a closed position, and which has a shoulder 144 for engagement by an opening actuator.

The lower part of the valve housing is hollow, carrying an actuator 148 journalled on a cross shaft 149, the actuator having projections 150 and 152 respectively engageable at times with the poppet valve shoulders 144 and 130. When the actuator is rotated counterclockwise as shown, the vent poppet 142 is opened; when rotated clockwise, the pressure fluid poppet 128 is opened; when central as shown, both poppets are closed. The actuator chamber, though partly filled with hydraulic fluid, vents to the fluid spring through an opening 154 and to the poppet faces through grooves or holes in the poppet edges, 142′ and 128′ respectively.

The shaft 149 carries a lever 156, sloped at its lower end as shown to engage the upper rim of fluid spring plunger 86 substantially in the middle of the slope when the fluid spring is at the desired level or length. When the fluid spring shortens, the lever swings clockwise, and when it lengthens, counterclockwise. A spring 158 engaged with the lever and housing urges counterclockwise lever movement. The shaft 149 is coupled to the actuator 148 by spring 160, one end of the spring engaging a slot in the end of the shaft, and the other engaging a pin 161 on a downwardly projecting arm 162 of the actuator. The spring holds the actuator in a central position, leaving the poppets 128 and 142 closed, when the lever 156 is in the position for desired fluid spring length. Movement of the actuator is delayed or damped by a two-way dashpot arrangement filled with oil or hydraulic fluid, comprising a transverse cylinder 164 at the bottom of the valve housing, to which is fitted a piston having two heads 166 and 167 in opposed parts of the cylinder, whose heads are closed as shown. The piston heads are furnished with bleed openings 168 and 169, and the lower end of the arm 162 engages a slot between the pistons. As mentioned, the lower part of the housing, including the dashpot arrangement, is filled with hydraulic fluid. Thus, with fast oscillations of the lever 156, the dashpot deters oscillation of the actuator 148, whereas slow oscillations, or protracted displacement of the lever 156, allows the actuator 148 to turn, opening one or the other poppet 128 or 142 to admit pressure fluid to, or to vent fluid from, the fluid spring. Any desired degree of damping may be designed into the system, by the size of the bleed holes 168 and 169 with relation to the stiffness of spring 160.

As shown in FIG. 17, two separate pistons 166a and 167a may be used, each spring-pressed toward the mid-position, whereby different damping rates may be obtained for opening and closing of the poppet valves.

FIGS. 18 and 19 show a valve arrangement wherein the general valve structure and mode of operation are like those of FIGS. 13–17, but wherein the poppet valves 128 and 142 are replaced by collapsible elastomeric bladders. One such bladder 172 leads from the pressure fluid entry port 126 through a bore in the valve housing and opens into the fluid spring through a preformed flattened end 173 comprising a one-way lip valve, which functions as an integral check valve, allowing flow into the fluid spring but preventing reverse flow. The actuator cam 152a engages a light spring leaf 175 resting against the bladder 72, the cam pressing the bladder closed. When the actuator turns clockwise it relieves pressure on the leaf 175 and allows the bladder to expand, admitting fluid therethrough. In similar fashion, the vent valve comprises a collapsible elastic bladder 177 leading from an open lower end, past the actuator, to the vent 135 (as in FIG. 15). The leaf 175 rests against a part of bladder 177, and actuator cam 150a normally pinches the bladder closed. Upon counterclockwise actuator movement, the bladder 177 may open to vent the fluid spring to atmosphere.

The principles of the invention are applicable to fluid spring arrangements where the self-levelling valve is a unit separate from the fluid spring, and where fluid springs of other than cylinder-plunger types are used. For instance, FIG. 27 shows a bellows fluid spring 180 disposed between an axle 181, and a vehicle frame 182. Reasonably close to the spring 180, a self-levelling valve 184 is secured as to the frame, and the valve mechanism is coupled to the axle or to the usual radius or torque rod 185 by a pivoted link or strut 186 connected to an actuating lever 187 of the valve 184. Pressurized fluid feeds to the valve 184 from a conduit 189, and regulated fluid passes from the valve to the fluid spring through a conduit 190.

FIGS. 20, 21 and 24 show one arrangement for valve 184. At its left end as shown in FIG. 20 is the pressure fluid inlet fitting 189 clamped in the end of an elastomeric bladder 188 of special form, the bladder being contained and fitted in a bore in the valve housing, and having a one-way lip valve, or check valve 191 formed therein at its rightward end. The fitting 189 carries a tube 193 leading to a chamber 192 in the side of the valve housing, formed by a plate 195, and confining a diaphragm 194. This diaphragm is pressed rightwardly (FIG. 24) by pressure from the fluid spring, connected to the valve at the fitting 190, the fitting opening to the lip valve 191 and to the diaphragm left side through passage 198. When the pressure fluid supply is opened to the valve 184, the diaphragm moves leftwardly and opens a valve 200, opening the fluid spring to a lower cavity 201 in the housing, through a passage 202. In the cavity 201 is another elastomeric bladder 204, opening at its left end to an atmospheric vent 205.

As in previously described arrangements of my invention, the diaphragm 194 and associated parts seal off the fluid spring from venting when the pressure fluid supply is not turned on for adjusting fluid spring level.

Bladders 188 and 204 are reciprocally operated as valves, by squeezing them or opening them by sprung-apart shoes 208 and 210 within the housing, these having cam follower risers 211 and 212 engaged by portions of an oscillatable transverse shaft 214 journalled in the housing. This shaft has steps, as shown, which hold both elastomeric tubes shut or pinched, in the position shown when charging is not in progress. Upon shaft turning in one direction, one shoe moves inwardly, allowing the corresponding bladder to open. On shaft turning in the other direction, the other bladder is allowed to open. Since the shaft 214 is secured to the lever 187 (FIG. 27) and link 186, vehicle level controls inflation of the fluid spring to bring the level to the point where both tubes 188 and 204 are shut off. During vehicle travel when there is no fluid supply and no pressure in the tubes, the shoe-holding springs squeeze the tube valves and leave the shaft 214 free to oscillate without continuous wear on the cam followers.

FIG. 22 shows a cross section of an alternative elastomeric bladder valve form 217 molded to embrace an elongated element 218 of dumbbell cross section, and stretched thereover. When closing pressure is exerted against the top and bottom, elements 217 and 218 are pressed together to stop fluid flow; when pressure is released, they separate and allow fluid flow. This construction minimizes possibility of checking or cracking at the edges of the slit opening through the bladder. Good sealing is further afforded by making the distance 219 on the insert less than the distance 220 on the bladder, whereby the tube is stretched around the dumbbell ends when the bladder is closed. Element 218 may be of metal, of plastic, or of elastomeric material.

FIG. 23 shows a cross section through another alternative bladder valve. Herein, the bladder 222 is stretched over an elastic, fairly stiff, convex filler strip 223 having rounded edges. When open as shown, the strip assumes its convex form and allows a fluid passage through the bladder. When pressed shut, the strip 223 flattens laterally and in so doing becomes wider, stretching the bladder 222 laterally and preventing leakage at the margins of the closed passage. Yet, the smoothly rounded edges of the strip 223 prevent checking or cracking of the bladder 222 where it is almost, but not quite, flattened out.

FIGS. 25 and 26 show a valve for self levelling fluid springs of the type shown in FIG. 27, combining features of the arrangements of FIG. 20 and of FIG. 15. It is adapted for continuous pressurization during travelling, and incorporates damping to prevent inflation or deflation of the fluid spring during transient or short-duration oscillations. Reference characters are the same as those used for corresponding elements in FIGS. 15 and 20. This unit omits check valves and the automatic vent cut-off valve, and is adapted for use with heavy vehicles such as rail cars, trucks and buses, where protection against jouncing, when the vehicle is not attended, is not required.

FIG. 31 shows a valve functionally the same as that of FIG. 20, except that the elastomeric check valve 191 is replaced by a ball check valve 226. This allows external connections to the poppet valve and diaphragm assembly comprising parts 194a and 200a, so that this assembly may be separate, and applied if needed. Without parts 194a and 200a, the arrangement is like that in FIG. 26.

FIGS. 28 and 29 show another type of master control valve employing elastomeric bladders and equivalent in function to the control valve of FIG. 3, and may be used with a circuit as in FIG. 30 instead of that of FIG. 2. In FIGS. 28 and 29, the high pressure bladder valve 188b is normally closed by cam 230, shutting off pressure fluid from the pressure fluid reservoir 36. Concurrently, cam 230 allows the vent bladder 204b to be open, venting the manifold 32. The cam is held in this position by a link 232 acted on by a spring 234. A diaphragm 236 is secured to the link 232 and is contained in a housing 238, the top of which is vented at 239, and the bottom of which is connected through a tube 240 to the intake manifold of the vehicle engine. When the engine is running and its manifold vacuum is considerable, evacuation of the bottom of the housing 238 pulls down the diaphragm 236 and link 232, shifting the cam 230 to open the pressure bladder 188b and closing the vent bladder 204b. During transition both valves are closed for an instant, avoiding venting of pressure fluid. This charges the manifold 32, enabling the self-levelling valves of the fluid springs 30 to operate as described.

To avoid continuous pressurization of manifold 32 during vehicle travel, a solenoid 244 is energizable to open a bleed valve 246 which vents the lower part of the housing 238. The solenoid is in a circuit such as shown in FIG. 30. It is energized only when the vehicle ignition switch 70 is closed, when the switch 76 is closed by pressure of fluid in the actuator 77 resulting from transmission of power from engine to vehicle wheels, or when a throttle actuated switch 247 is closed, and from closure of transmission selector switch 75 by selection of "drive" or "reverse" adjustments. These closures, of course, imply vehicle motion. When any of the series-connected switches opens, so long as the engine is running, the fluid springs are conditioned for self-levelling. The switches 247 and 76, respectively throttle and transmission operated, are alternative so that one of them is closed during slow or fast vehicle travel, with either open or closed engine throttle. This arrangement yields solenoid 244 energization only during vehicle travel when the vehicle battery is charging, avoiding unnecessary battery drain.

A condition can exist, from the foregoing description, where the vehicle is stopped and the engine turned off before passengers leave the vehicle. This would result in vehicle body rise after unloading, as the self-levelling system is then inactive. This difficulty is easily overcome. In the diaphragm housing 238 (FIG. 28) where the intake manifold is connected to it, a one-way restricted valve 241 may be placed, this valve allowing the housing to be evacuated quickly when manifold vacuum is present, but providing a time delay for pressure rise in the housing after manifold vacuum ceases. Thus, the control valve is held in the active position for an interval after the vehicle engine stops, and allows the fluid springs to attain proper height after vehicle unloading.

As an alternate to automatic operation, manual operation may be provided, by a manually operated vent valve as in FIG. 28A, identified as 250. This is normally urged open by a spring 251. The valve 250 is installed in the manifold line 240 in lieu of the solenoid operated vent valve 244, 246. When closed by pressing a button 252, the control valve assembly is conditioned for charging the manifold 32 in the same manner as previously described.

It will be clear that I have shown a number of alternative components or sub-assemblies, as well as unified fluid-spring levelling systems. The systems may use various of the components in different combinations, choice being governed by design considerations, costs, the type of vehicle and service it is called upon to perform, and the driver's need for automatic, semi-automatic, or manual system control. While several embodiments and arrangements of my invention have been shown and described, it is to be understood that changes and modifications may be made therein without departing from the spirit or scope of the invention. The limits of the invention are set forth in the following claims.

I claim:

1. In a gaseous fluid-sprung travelling vehicle, a source of pressurized gaseous fluid, fluid spring units adapted automatically to receive fluid and to release fluid to adjust vehicle height to a substantially constant level, a control valve connecting said fluid source and spring units, and means to operate said control valve responsive to vehicle prime mover operation including means responsive to vehicle stoppage to open said control valve for fluid flow from said source to said units and to vehicle travelling to close said control valve and to vent the downstream side thereof to atmosphere.

2. An elastic fluid suspension system for a vehicle including a body and a plurality of road wheels, comprising an elastic fluid spring between each wheel and the body, a self-levelling valve associated with each said spring and connected to valve fluid thereto and therefrom, conduits connected to said valves, a source of fluid under pressure, and control valve means operable to connect said source to said conduits, said control valve means comprising means to pressurize said conduits with fluid when operated "on" and means to vent said conduits when "off," and said self-levelling valves including means responsive to conduit pressure to activate them for self-levelling.

3. An elastic fluid suspension system for a vehicle including a body and a plurality of road wheels, comprising an elastic fluid spring between each wheel and the body, a self-levelling valve associated with each said spring and connected to valve fluid thereto and therefrom, conduits connected to said valves, a source of fluid under pressure, and control valve means operable to connect said source to said conduits, said control valve means comprising means operable to pressurize said conduits with fluid from said source and to vent said conduits, and said self-levelling valves including means responsive to conduit pressurization to activate them for self-levelling in response to body height, and responsive to conduit venting to seal said self-levelling valves against entry and loss of fluid to and from said springs, respectively.

4. In combination with an elastic fluid spring for a vehicle, a valve assembly comprising a pressure fluid inlet and a vent, a valve element connected to said inlet and to said spring openable to admit pressure fluid to said spring, a second valve element connected to said spring and to said vent openable to pass fluid from said spring to said vent, means operable in response to fluid spring length to close both said valve elements, to open one and close the other, and to open the other and close the one, a check valve adjacent said fluid inlet permitting flow in one direction from said inlet to said spring, a third valve element normally closing said vent, and means actuated by fluid pressure in said inlet to open said third valve element.

5. A combination according to claim 4 including mechanism to suppress operation of said operable means during fluid spring action at high frequency oscillations.

6. A combination according to claim 4 including mechanism to tolerate operation of said operable means only during fluid spring oscillations of greater than twice the natural frequency of said spring means.

7. In combination with an elastic fluid spring for a vehicle comprising a body and a wheel, the spring supporting the body on structure associated with the wheel, a valve assembly having a fluid connection to said spring, an inlet port and a vent port, a valve actuator movable to positions to close both ports from said connection, to open one to the connection, and to open the other to the connection, said valve and actuator being securely associated with said fluid spring and said actuator having engagement at times with said wheel-associated structure, means responsive to fluid pressure at said valve inlet to engage said actuator with the wheel-associated structure, and means responsive to removal of fluid pressure at said valve inlet to disengage said actuator from the wheel-associated structure.

8. In an elastic fluid spring for a travelling vehicle comprising a plunger sealed and movable relatively to a vehicle-body-carried fluid container, a valve secured to the container having an arm pivoted thereto for engagement with the plunger at certain positions of the plunger relative to the container, said arm being swingable on its pivot as the plunger moves toward and from the container, said valve having an entry for pressure fluid and having a vent, a valve element for said entry and another for said vent both in said valve, means operated by said arm connected to operate said valve elements to close both of them at one swing position of the arm and to open and close them reciprocally at other positions of the arm, and means responsive both to vehicle engine in operation with opened throttle and to vehicle travelling under power to hold both said valve elements in closed position, said responsive means also holding both said valve elements in closed position when the vehicle engine is not operating, regardless of vehicle motion or rest.

9. In an elastic fluid spring according to claim 8, means responsive to pressure fluid in said pressure fluid entry operable to swing said arm into plunger engagement, and otherwise to relax said arm from plunger engagement.

10. In an elastic fluid spring according to claim 8, valve means responsive to ambient pressure in said pressure fluid entry to seal said vent and fluid entry against fluid escape from said fluid spring.

11. An elastic fluid spring according to claim 8, wherein said valve elements in said valve body comprise elastic bladders, and said valve operating means includes means to squeeze said bladders shut and to disengage them for opening and fluid flow therethrough.

12. An elastic fluid spring according to claim 8, wherein said valve elements in said valve body comprise spring-closed poppet valves, and said valve operating mechanism includes cam devices alternately engageable with said poppet valves to open them.

13. In a gaseous fluid-sprung travelling vehicle having an engine, a source of gaseous pressure fluid, fluid spring units adapted automatically to receive pressurized fluid and to release fluid to adjust vehicle height, a control valve connecting said fluid source and spring units, means to shut said control valve responsive to vehicle motion, and to open said control valve responsive to vehicle stoppage with the engine operating, and time-delay means operative to effect the actuation of said control valve an appreciable time after engine shut-down when the vehicle is stopped.

14. An elastic fluid suspension system for a vehicle including a body and a plurality of road wheels, comprising an elastic fluid spring between each wheel and the body, a self-levelling valve associated with certain of said springs and connected to valve fluid thereto and therefrom, conduits connected to said valves, a source of fluid under pressure, control valve means operable to connect said source to said conduits, and means responsive to and actuated by starting and operation of the vehicle to actuate said control valve to pressurize and vent said conduits.

15. A system according to claim 14, including means responsive to vehicle stoppage to actuate said control valve to pressurize said conduits and responsive to vehicle motion to actuate said control valve to vent said conduits.

16. An elastic fluid suspension system for a vehicle including a body and a plurality of road wheels, comprising an elastic fluid spring between each wheel and the body, a self-levelling valve associated with certain of said springs and connected to valve fluid thereto and therefrom, conduits connected to said valves, a source of fluid under pressure, control valve means to connect said source to said conduits, means responsive to vehicle powerplant starting and operation to ready said control valve for pressurization of said conduits, and means responsive to vehicle stoppage and travelling respectively to open said control valve for conduit pressurization and to close said control valve for conduit venting.

17. In a motor vehicle having a chassis member and a wheel member, a resilient air spring mounted between said members, a source of air under pressure for said air spring, leveling control mechanism mounted upon one of said members, actuating means for said leveling control mechanism operatively connected to the other of said members to be responsive to variations in the relationship between said chassis member and said wheel member to maintain a predetermined relationship therebetween, a conduit establishing communication between said leveling control mechanism and said air spring, a valve seat in said conduit, a valve adapted to engage said valve seat to close said conduit, said valve having a valve stem projecting into a valve bore intersecting said conduit, and an actuating piston in said valve bore secured to said valve stem, said piston having its valve stem end subjected to the pressure in said conduit and its opposite end subjected to the pressure of said air source.

18. Control valve mechanism for regulating the air pressure within a vehicle air spring for maintaining the vehicle frame a predetermined distance above the vehicle axle, comprising a leveling valve having a casing adapted to be mounted on the frame and having an inlet adapted to be supplied with compressed air or connected with atmosphere, an exhaust port in said casing connected at all times to atmosphere, valve means in said casing for controlling the alternative flow of compressed air from said inlet to said air spring or from said air spring to said exhaust port, check valve means in said casing for positively preventing at all times the flow of compressed air from said air spring to said inlet, normally closed third valve means in said casing for controlling the flow of compressed air from said air spring to said exhaust port independently of said first valve means, and a pressure responsive member constantly subjected to the pressure at said inlet for moving said third valve means to open position when said inlet is supplied with compressed air.

19. Control valve mechanism for regulating the air pressure within a vehicle air spring for maintaining the vehicle frame a predetermined distance above the vehicle axle comprising a leveling valve having a casing adapted to be mounted on the frame and having inlet and exhaust passages therein respectively connected to said air spring, valve means within the casing for controlling the flow of compressed air to and from the air spring by opening and closing said inlet and exhaust passages in accordance with relative movement between the frame and axle, a piston responsive to air pressure in said inlet passage movable from a first position to a second position by the admission of fluid pressure to said inlet passage, resilient means normally urging said piston toward its first position, second valve means in said exhaust passage operatively connected to said piston to close said exhaust passage when said piston is in its first position and open said passage when said piston is in its second position.

20. Control valve mechanism for regulating the air pressure within a vehicle air spring for maintaining the vehicle frame a predetermined distance above the vehicle axle, comprising a leveling valve having a casing adapted to be mounted on the frame, and having an inlet adapted to be supplied with compressed air or connected with atmosphere, valve means within the casing for controlling the flow of compressed air to and from the air spring, a cam movable in response to relative movement between the frame and axle and operatively connected with said valve means for operating the latter, and means for interrupting the operative connection between the cam and valve means when said inlet is connected to atmosphere.

21. Control valve mechanism for regulating the air pressure within a vehicle air spring for maintaining the vehicle frame a predetermined distance above the vehicle axle, comprising a leveling valve having a casing adapted to be mounted on the frame, and having an inlet adapted to be supplied with compressed air or connected with atmosphere, valve means within the casing for controlling the flow of compressed air to and from the air spring, means including an oscillatable lever responsive to relative movement between the frame and axle and operatively connected with said valve means for operating the latter, and means for interrupting the operative connection between the lever and valve means when said inlet is connected to atmosphere.

22. Control means for regulation of the supply and exhaust of air under pressure to and from an expansible air spring disposed between a sprung mass and an unsprung mass of a vehicle to maintain a regulated clearance height between the sprung and the unsprung mass of the vehicle and retain control over the level condition of the vehicle, including, air pressure control means having passage means therein for conducting air pressure to and from an air spring and including valve means regulating said air flow through the said passage means and further including operating means for the valve means adapted for actuation by relative movement between the sprung mass and the unsprung mass of a vehicle to effect regulated flow of air through said passage means in response to clearance height changes between the said sprung mass and the unsprung mass, said air pressure control means including an additional control means operated by air pressure existent in the air pressure conducting passage means of said air pressure control means to render said air pressure control means active to control air flow to and from the air spring controlled thereby and also operated by loss of air pressure in the air pressure conducting passage means of said air pressure control means to render said air pressure control means inactive to control air flow to and from the air spring controlled thereby, valve means in the air pressure conducting passage means of said air pressure control valve to control supply or loss of air in said air conducting passage means, and further control means responding to predetermined established conditions on the vehicle to actuate or deactuate said last valve means to control supply and exhaust of air to and from the said air conducting passage means for said air pressure control valve means to render the same active or inactive in response to the predetermined established conditions on the vehicle, said last-named control means comprising a series of electric switch means responding to a plurality of predetermined static and operating conditions of said vehicle including ignition circuit closing and vehicle acceleration electrically connected to provide for actuation of said last-named valve means to supply air to said air pressure control means when said vehicle is in a generally static state and to de-actuate said last-named valve means when said vehicle is moving.

References Cited in the file of this patent

UNITED STATES PATENTS

| 1,555,199 | Gouriand | Sept. 29, 1925 |
| 1,585,833 | Down | May 25, 1926 |
| 1,664,510 | Hughes | Apr. 3, 1928 |
| 2,092,401 | Miller | Sept. 7, 1937 |
| 2,313,550 | Huber | Mar. 9, 1943 |
| 2,361,575 | Thompson | Oct. 31, 1944 |
| 2,615,668 | Ernest | Oct. 28, 1952 |
| 2,644,699 | Weiertz | July 7, 1953 |
| 2,670,201 | Rossman | Feb. 23, 1954 |
| 2,687,311 | Nallinger | Aug. 24, 1954 |
| 2,787,475 | Jackson | Apr. 2, 1957 |

FOREIGN PATENTS

| 602,490 | Great Britain | May 27, 1948 |